(12) United States Patent
Ou et al.

(10) Patent No.: US 8,794,883 B2
(45) Date of Patent: Aug. 5, 2014

(54) ROTARY SPINDLE HEAD WITH GEAR REDUCER

(75) Inventors: Feng-Ming Ou, Taichung (TW); Yu-Hsi Hsing, Taichung (TW); Hsi-Hung Hsiao, Taichung County (TW); Ching-Yuan Lin, Taichung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 821 days.

(21) Appl. No.: 12/945,574

(22) Filed: Nov. 12, 2010

(65) Prior Publication Data
US 2012/0020752 A1    Jan. 26, 2012

(30) Foreign Application Priority Data
Jul. 20, 2010    (TW) .............................. 99123785 A (51) Int. Cl.
*B23C 1/12* (2006.01)
*B23Q 5/16* (2006.01)
*B23Q 1/54* (2006.01)

(52) U.S. Cl.
CPC .......... *B23Q 5/162* (2013.01); *B23Q 2220/006* (2013.01); *B23Q 2210/004* (2013.01); *B23Q 1/5406* (2013.01)
USPC .......................................... 409/201; 409/211

(58) Field of Classification Search
USPC .............. 409/201, 211, 216; 74/813 L, 813 R
See application file for complete search history.

(56) References Cited

U.S. PATENT DOCUMENTS

| 3,746,188 A | | 7/1973 | Stienen et al. |
| 5,257,883 A | * | 11/1993 | Armando ...................... 409/201 |
| 5,584,621 A | * | 12/1996 | Bertsche et al. .............. 409/201 |
| 5,996,329 A | | 12/1999 | Cardenas |
| 6,669,416 B2 | | 12/2003 | Klement |

(Continued)

FOREIGN PATENT DOCUMENTS

| DE | 102005043835 A1 | 3/2007 |
| DE | 102006039202 A1 | 3/2008 |

(Continued)

OTHER PUBLICATIONS

Colombo, Roberto, DD motor Application and Principle at 5 Axes head, Mar. 2010, pp. 25-30.

(Continued)

*Primary Examiner* — Daniel Howell
*Assistant Examiner* — Mohammad Nourbakhsh
(74) *Attorney, Agent, or Firm* — Morris Manning & Martin LLP; Tim Tingkang Xia, Esq.

(57) ABSTRACT

A rotary spindle head with gear reducer is provided, which comprises a rotary spindle unit, a fork-shaped type spindle base and a driving unit. The fork-shaped spindle base is for linking up the rotary spindle unit with a machine tool, and the driving unit comprises a torque motor and a gear reducer which are sited coaxially on the fork-shaped spindle base. The gear reducer is connected to the rotary spindle unit to drive and rotate the rotary spindle unit in the fork-shaped spindle base. The gear reducer is designed to lower decelerating rate. Besides, the input and output of the gear reducer are coaxial design, the torque of torque motor could be magnified to several times and maintain higher rotational speed to do the high speed light cutting and high torque heavy cutting work.

9 Claims, 6 Drawing Sheets

(56) References Cited

U.S. PATENT DOCUMENTS

| | | | |
|---|---|---|---|
| 7,293,340 B1 * | 11/2007 | Tsao et al. | 29/428 |
| 7,470,095 B2 * | 12/2008 | Brunemann | 409/201 |
| 7,475,613 B2 | 1/2009 | Bailey | |
| 2010/0170372 A1 * | 7/2010 | Tatsuda | 82/146 |
| 2010/0310335 A1 * | 12/2010 | Tatsuda et al. | 409/204 |

FOREIGN PATENT DOCUMENTS

| | | | |
|---|---|---|---|
| DE | 102006046694 A1 | 4/2008 | |
| DE | 102009044788 A1 | 8/2011 | |
| EP | 1880796 A1 | 1/2008 | |
| EP | 2075085 A1 | 7/2009 | |
| JP | 10253941 A | 9/1998 | |
| JP | 2003266256 A | 9/2003 | |
| JP | 2003340660 A | 12/2003 | |
| JP | 2006289593 A | 10/2006 | |
| JP | 200873839 A | 4/2008 | |
| TW | M344938 U | 11/2008 | |
| TW | 200934610 A | 8/2009 | |
| WO | 2009034030 A2 | 3/2009 | |

OTHER PUBLICATIONS

Kassanayaki, K.M. Muditha, et al., A strategy for identifying static deviations in universal spindle head type multi-axis machining center, International Journal of Machine Tools & Manufacture, 2006, vol. 46, Issue 10.

Bi, Z. M., et al., Development of reconfigurable machines, Int. J. Adv. Manuf. Technol., 2008, pp. 1227-1251, vol. 39.

German Patent Office, "Office Action", Mar. 29, 2012, Germany.

Five-axis high speed machining center development trend, H&Z Industry Media, Aug. 10, 2007, Shanghai, China.

Intellectual Property Office, Ministry of Economic Affairs, R.O.C., "Office Action", Jan. 21, 2013, Taiwan.

* cited by examiner

ROTARY SPINDLE HEAD WITH GEAR REDUCER

CROSS-REFERENCE TO RELATED APPLICATIONS

This non-provisional application claims priority under 35 U.S.C. §119(a) on Patent Application No(s). 099123785 filed in Taiwan, R.O.C. on Jul. 20, 2010, the entire contents of which are hereby incorporated by reference.

TECHNICAL FIELD

The present disclosure relates to a rotary spindle head for multi-axis machine tools, and more particularly, to a high-speed, high-torque rotary spindle head with gear reducer.

TECHNICAL BACKGROUND

With rapid advance of alternative energy industry, such as wind power generation, the demand for large-scale, multi-axis/multi-process machine tools is increasing therewith. Consequently, the demand for rotary spindle heads used in those machine tools that are capable of withstanding high torque and high rotation speed are increasing as well.

Figure 1:
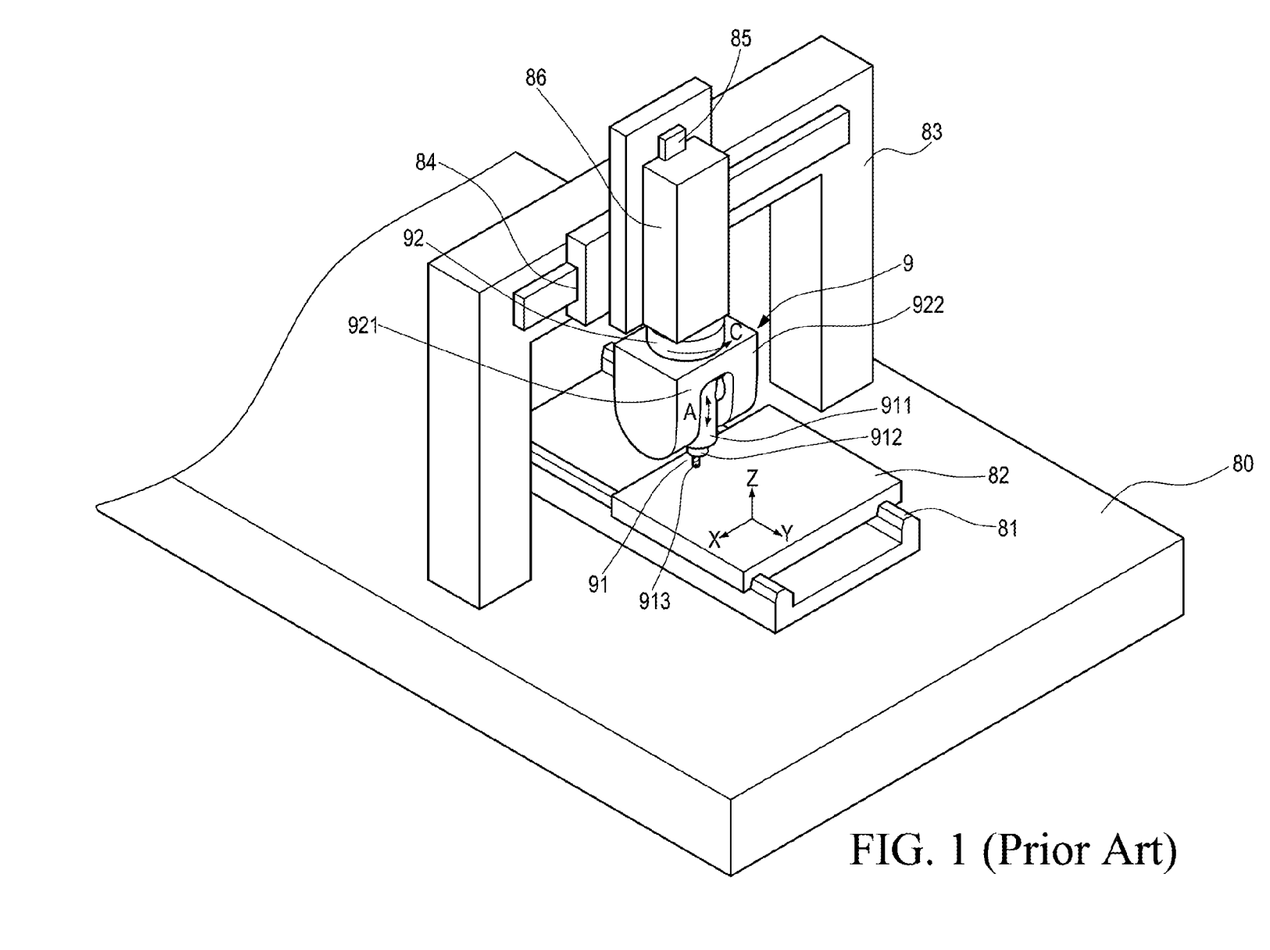
FIG. 1 shows a conventional large-scale multi-axis machine tool.

Please refer to FIG. 1, which shows a conventional large-scale multi-axis machine tool. As shown in FIG. 1, a working bench 82 that is mounted on a first rail set 81 is disposed on a platform 20 for a workpiece to be placed thereon, and there is a frame 83 having a second rail set 84 mounted thereon that is disposed above the platform 80 while providing a third rail set 85 to mounted on the second rail set 84 whereas a spindle head 9 coupled to a seat 86 is mounted on the third rail set 85, by that a system capable of moving in a space defined by a three dimensional XYZ axis model can be constructed since the first, the second and the third rail sets 81, 84, 85 are disposed perpendicular to each other.

Moreover, the spindle head 9 is composed of a spindle unit 91 and a fork-shaped spindle base 92, whereas the spindle unit 91 is further composed of: a rotary base 911, a spindle 912 and a cutting tool 913 that is mounted on the spindle 912 so as to be brought along to rotate with the rotation of the spindle 912, in that the rotary base 911 is hinged to the two supporting arms 921, 922 of the fork-shaped spindle base 92 for enabling the rotary base 911 to perform an axial rotation indicated by the arrow A shown in FIG. 1. Consequently, in addition to that the spindle head 9 is mounted on the seat 86 in a manner that it is able to perform another axial rotation indicated by the arrow C shown in FIG. 1, a multi-axis machine tool is constructed.

Generally, there are three types of spindle head design, which are a design of a spindle head to be driven by serve motors coupled to a speed reduction mechanism, a design of a spindle head to be driven directly by torque motors, and a design of a spindle head to be driven by torque motors coupled to a speed reduction mechanism.

There are examples relating to the design of a spindle head to be driven by serve motors coupled to a speed reduction mechanism that are disclosed in U.S. Pat. No. 5,257,883, U.S. Pat. No. 5,996,329, etc, in which the disclosure of the U.S. Pat. No. 5,257,883 shows a fork-shaped structure with two supporting arms that is provides for enabling a spindle head to be driven by the rotation of a bevel gear reduction system as the gear system is driven by a servo motor; and the disclosure of the U.S. Pat. No. 5,996,329 uses two serve motors that are coupled respectively to a reduction mechanism of worm gears and worm wheels and another bevel gear reduction system for controlling the rotation of a spindle in two different rotation directions that are orthogonal to each other.

Since the output torque of the serve motor used for driving the spindle head to rotate is comparatively smaller, the speed reduction mechanism coupled to the servo motor must be designed with high reduction ratio from several tens-to-one to substantially several hundreds-to-one so as to enlarge the output torque of the servo motor sufficiently enough for the rotary spindle head to operate. However, the foresaid design using serve motors coupled to a speed reduction mechanism of high reduction ratio is short in that: (a) the mechanical transmission of high reduction ratio can cause considerable loss in mechanical efficiency in comparison to other transmission means; (b) the mechanical transmission of high reduction ratio will greatly reduce the rotation speed of the spindle head so that it can not be used for high speed machining; and (c) the mechanical transmission of high reduction ratio usually is designed with larger volume that the design degree-of-freedom of the rotary spindle head can be adversely affected.

One example relating to the design of a spindle head to be driven by directly by torque motors is disclosed in U.S. Pat. No. 7,293,340, in which there are two torque motors disposed respectively at the two supporting arms of a fork-shaped structure so as to be used for directly and cooperatively driving a spindle head to rotate.

Since torque motor is able to output comparatively higher torque, the design of a spindle head to be driven by directly by torque motors is featuring by its low power loss and high rotation speed. Nevertheless, in addition to the cost increasing from the use of two torque motors, in a design point of view, when larger torque motors with larger torque outputs are chosen for conforming to the operation requirement of its spindle head, the overall volume as well as cost will increase with the increasing of its torque motor size and thus the design flexibility is compromised.

One example relating to the design of a spindle head to be driven by torque motors coupled to a speed reduction mechanism is disclosed in U.S. Pat. No. 7,470,095, in which a spindle head that is hinged inside a fork-shaped spindle base is brought to rotate by the use of a torque motor through a first-order gear transmission mechanism, and thereby, the torque output of the spindle head can be increased.

However, in U.S. Pat. No. 7,470,095, not only the torque motors are not disposed coaxially to the rotation axis of the spindle head, but also the selection of the torque motors along with the transmission mechanism that are capable of being used in this disclosure are restricted by the limited space available, so that the output torque of the spindle head resulting from the aforesaid disclosure is only ideal for light and medium machining applications. Moreover, since its input shaft and output shaft are not coaxially disposed, the dynamic balance of this disclosure is not satisfactory that requires to be improved.

TECHNICAL SUMMARY

The primary object of the present disclosure is to provide a high-speed, high-torque rotary spindle head for machine tools that is capable of overcoming the aforesaid shortcomings.

Another object of the present disclosure is to provide a rotary spindle head of good dynamic balance.

To achieve the above objects, the present disclosure provides a rotary spindle head with gear reducer, comprises a rotary spindle unit, composed of a spindle having a cutting tool mounted thereon and a rotary seat; a fork-shaped spindle base, disposed to the machine tool and is rotatably connecting to the rotary spindle unit; and a driving unit, having a torque motor and a gear reducer coaxially coupled to the torque motor; wherein, the structure of the coaxially disposed torque motor and the gear reducer is coupled to the fork-shaped spindle base while enabling the gear reducer to further coupled to the rotary spindle unit for bringing along the rotary spindle unit to rotate inside the fork-shaped spindle base.

Since the gear reducer has lower speed reduction ratio and has a speed reducing design with the coaxial arrangement of the input/output shafts, it is capable of magnifying the torque of the torque motor while retaining a higher rotation speed so that the rotary spindle head can be utilized for high-speed light-machining and high-torque heavy-machining.

Moreover, since the torque motor and the gear reducer are coaxially disposed that allows the spindle head to have a compact and symmetric configuration, not only the torque density is increased and the dynamic load is dispersed, but also a good dynamic balance can be obtained during the operation of the rotary spindle unit.

In an exemplary embodiment of the present disclosure, the gear reducer is primarily composed of: a driving gear, at least one idle gear, a ring gear and an axle seat, in a manner that the driving gear is configured to be driven by the torque motor; the at least one idle gear is mesh respectively with the driving gear and the ring gear while being pivotally coupled to an axial part; the ring gear is disposed coaxially with the driving gear and is coupled to the rotary spindle unit by the use of an axis that is formed at a side of the ring gear for bringing along the rotary spindle unit to rotate accordingly.

In an exemplary embodiment of the present disclosure, the carrier further comprises: a coupling member, disposed at a side of carrier corresponding to the torque motor for coupling the carrier with the rotary spindle unit so as to bring along the same to rotate accordingly.

In an exemplary embodiment of the present disclosure, the fork-shaped spindle base further comprises: a fixing seat, extrusively formed at a position corresponding to a motor seat of the torque motor while interlocking thereto so as to fixedly secured the torque motor; the torque motor is further configured with a ring-like stator and a rotor in a manner that the rotor is received inside the ring-like stator while coupling to the same, and is provided for coupling with a shaft for enabling the gear reducer to be driven by the shaft.

In an exemplary embodiment of the present disclosure, there are a plurality of cooling channels formed at positions between the circumference of the stator and the motor seat so as to be provided for cooling fluids to flow therethrough and thus dissipating heat produced from the operating torque motor.

In an exemplary embodiment of the present disclosure, the fork-shaped spindle base further comprises: a first supporting arm and a second supporting arm, being respectively configured at two opposite sides of the fork-shaped spindle base that are provided for the rotary spindle unit to be pivotally coupled therebetween.

In an exemplary embodiment of the present disclosure, both the first supporting arm and the second supporting arm are hollow structures, respectively having a first accommodation space and a second accommodation space formed therein, and the first accommodation space is provided for receiving the driving unit.

In an exemplary embodiment of the present disclosure, the fork-shaped spindle base further comprises: a locking interface including a plurality of locking holes for the machining tool to be connected thereby; and the machine tool is a device selected from the group consisting of: vertical machine tools and horizontal machine tools.

In an exemplary embodiment of the present disclosure, the rotary spindle unit further comprises: a rotary seat, pivotally coupled to the fork-shaped spindle base, provided for the spindle to be coupled thereat in a manner that the spindle is disposed downward protruding out of the rotary seat so as to be provided for the cutting tool to mounted thereon and used for machining a workpiece.

In an exemplary embodiment of the present disclosure, the fork-shaped spindle base further comprises: a brake device and an angle encoder, both disposed at a side of the fork-shaped spindle base at a position corresponding to the driving unit so as to be used for tightly clamping the rotary spindle unit while providing information relating to the precise positioning of the same.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 2:
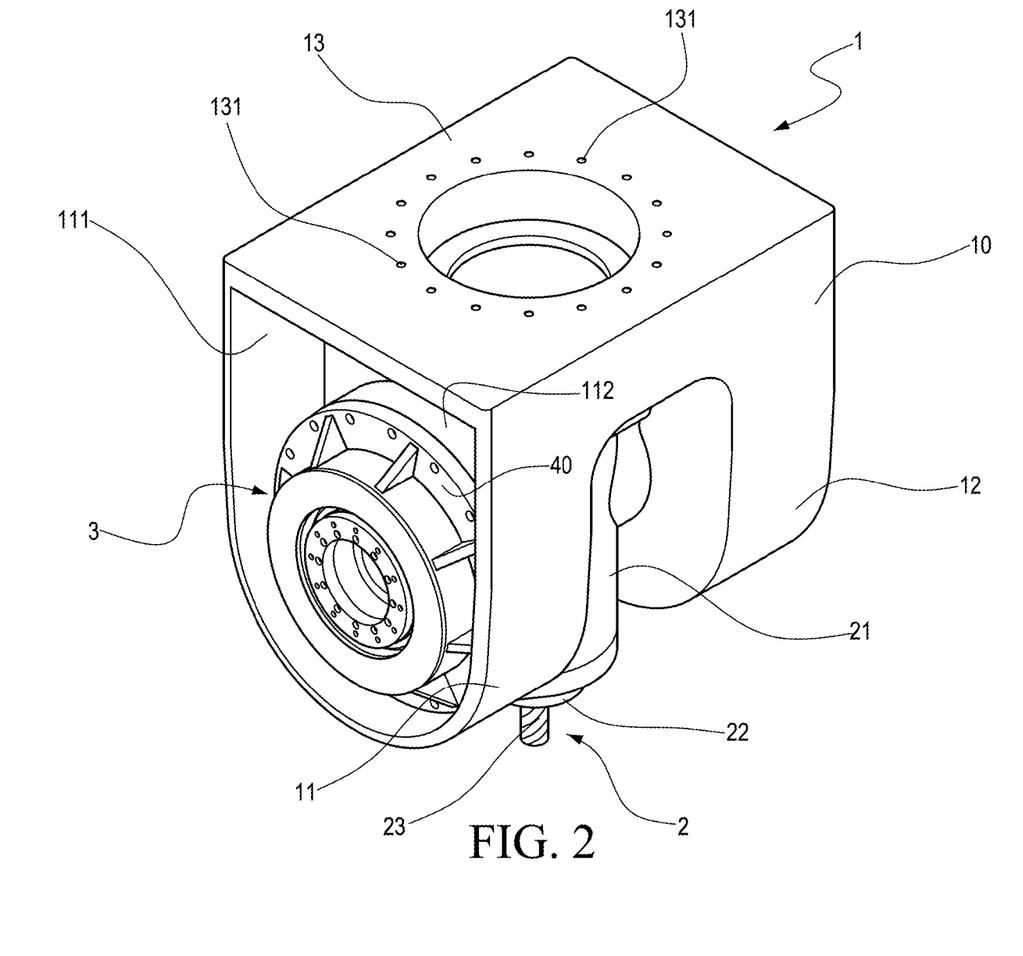
FIG. 2 is a three-dimensional view of a rotary spindle head according to an embodiment of the present disclosure.
Figure 3:
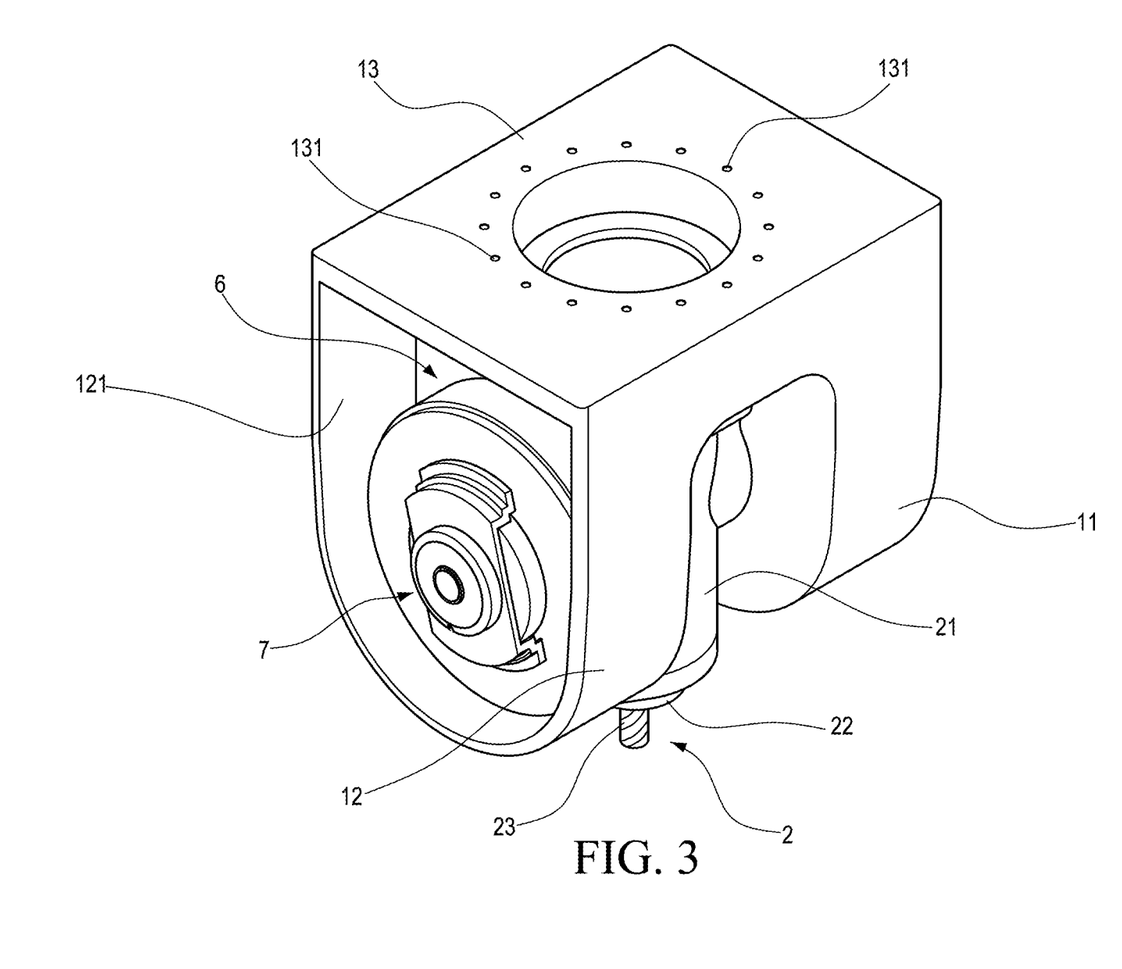
FIG. 3 is another three-dimensional view of the rotary spindle head of FIG. 2, but from a viewing angle different from that of FIG. 2.
Figure 4:
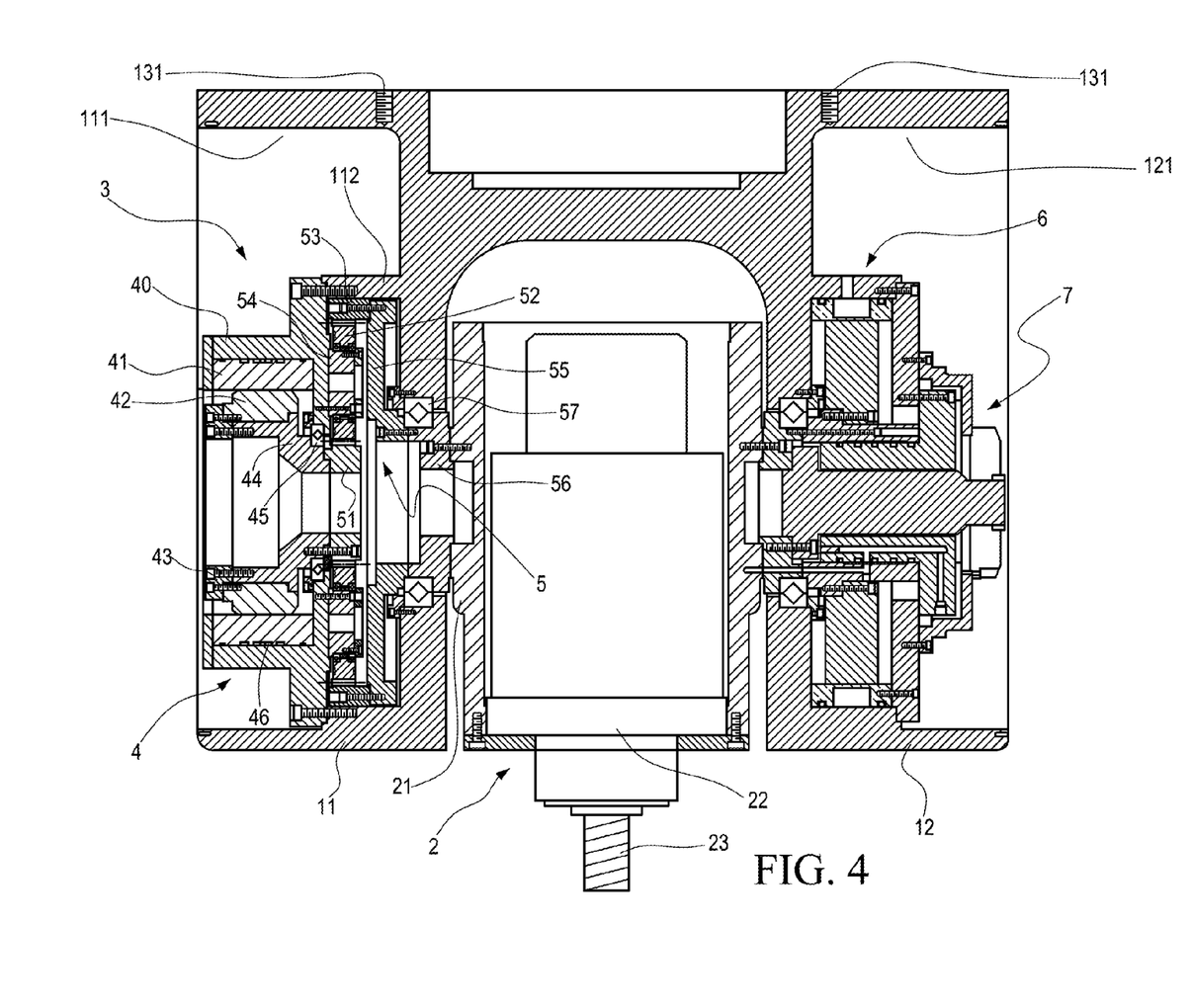
FIG. 4 is a cross sectional view of a rotary spindle head according to an embodiment of the present disclosure.
Figure 5:
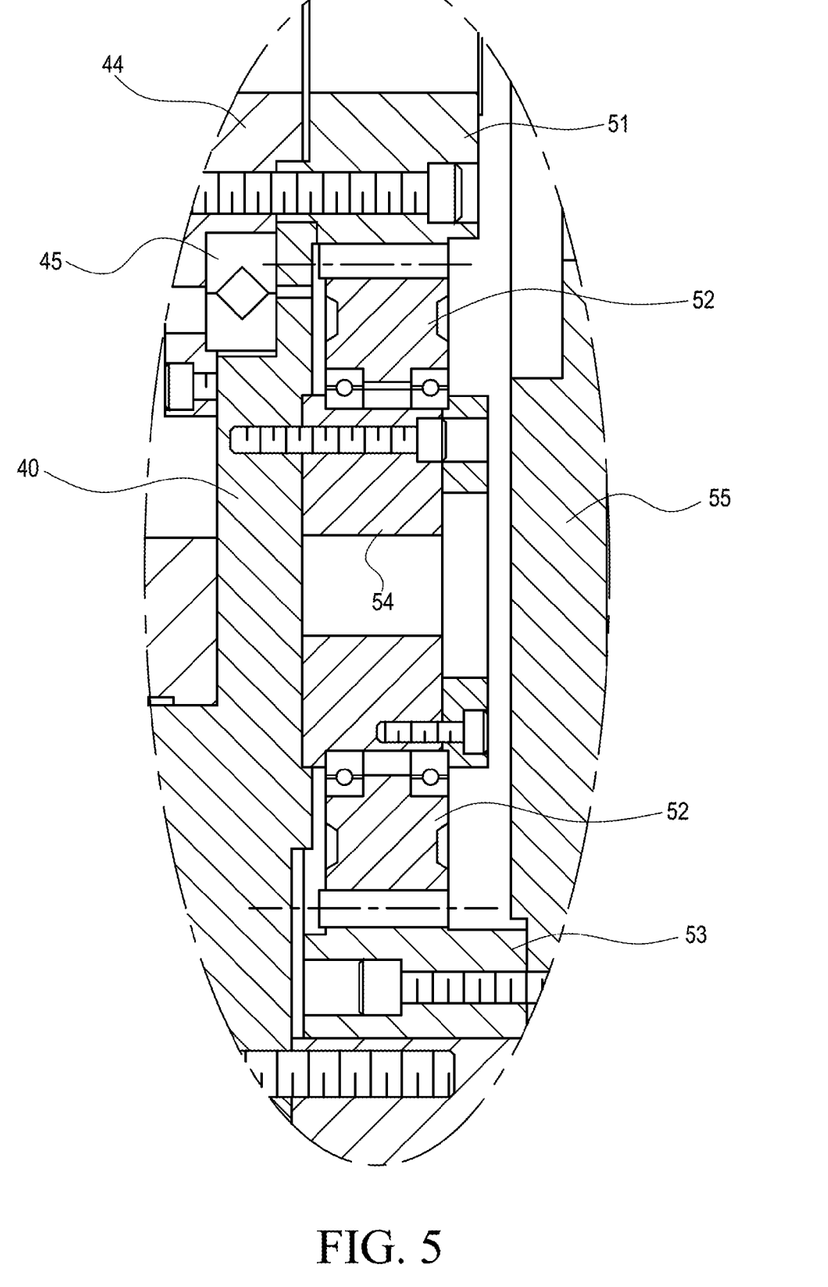
FIG. 5 is a cross sectional view of a gear reducer used in the present disclosure.
Figure 6:
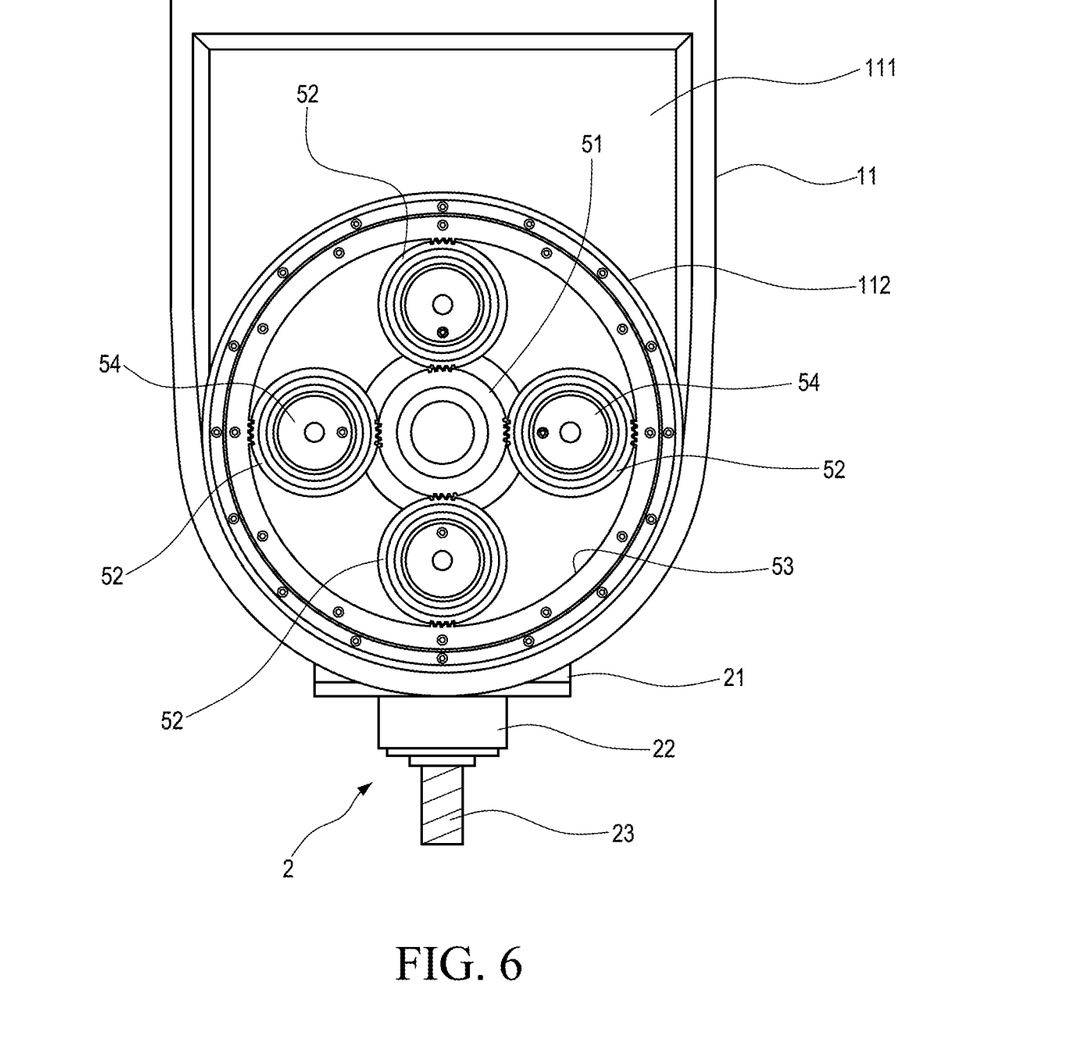
FIG. 6 is a side view of a gear reducer used in the present disclosure.

Please refer to FIG. 2 to FIG. 6, in which FIG. 2 is a three-dimensional view of a rotary spindle head according to an embodiment of the present disclosure; FIG. 3 is another three-dimensional view of the rotary spindle head of FIG. 2, but from a viewing angle different from that of FIG. 2; FIG. 4 is a cross sectional view of a rotary spindle head according to an embodiment of the present disclosure; FIG. 5 is a cross sectional view of a gear reducer used in the present disclosure; and FIG. 6 is a side view of a gear reducer used in the present disclosure.

As shown in FIG. 2, a rotary spindle head of the present disclosure, being adapted for a machine tool, is primarily composed of: a fork-shaped spindle base 10, a rotary spindle unit 2 and a driving unit 3.

The fork-shaped spindle base 10 is substantially an inverted U-shaped structure having a first supporting arm 11 and a second supporting arm 12 that are respectively configured at two opposite sides of the fork-shaped spindle base 10 while enabling the rotary spindle unit 2 to be pivotally coupled therebetween. Moreover, the fork-shaped spindle base 10 further has a plurality of locking holes formed on a top surface thereof as a locking interface 13, which is provided for connecting with either a fixed base or rotary base of a vertical machine tool or horizontal machine tool.

The rotary spindle unit 2 further comprises a rotary seat 21, that is pivotally coupled to the fork-shaped spindle base 10 at a position between the first supporting arm 11 and the second supporting arm 12, while enabling a spindle 22 of the rotary spindle unit 2 to be disposed downward protruding out of the rotary seat 21 so as to be provided for a cutting tool 23 to mounted thereon and used for machining a workpiece.

In addition, both the first supporting arm 11 and the second supporting arm 12 are hollow structures, respectively having a first accommodation space 111 and a second accommodation space 121 formed therein; and the first accommodation space 111 is provided for receiving the driving unit 3 as the driving unit 3 is used for driving the rotary spindle unit 2 to rotate, while the second accommodation space 121 is provided for receiving a brake device 6 and an angle encoder 7, that are used for tightly clamping the rotary spindle unit 2 while providing information relating to the precise positioning of the same. It is noted that configuration as well as the function of both the brake device 6 and the angle encoder 7 are known to those skilled in the art and thus will not be described further herein.

As shown in FIG. 4 and FIG. 5, the driving unit 3 is composed of a torque motor 3 and a gear reducer 4. It is noted that the first accommodation space 111 of the first supporting arm 11 has a stair-like fixing seat 112 that is extrusively formed at a position corresponding to a motor seat 40 of the torque motor 4 while interlocking thereto, by that the torque motor is fixedly secured to the first accommodation space 111 of the first supporting arm 11. In addition, the torque motor 4 is further configured with a ring-like stator 41 that is mounted to the inner periphery of the motor seat 40; and also the torque motor 4 further has a rotor 42 that is received inside the ring-like stator 41 while coupling to the same for generating torque due to electromagnetic effect, and is provided for coupling with a hollow shaft 44 by a panel 43 for enabling the gear reducer 5 to be driven by the shaft 44, whereas the shaft 44 is further connected to the motor seat 40 by a first bearing 45. Moreover, there are a plurality of cooling channels 46 formed at positions between the circumference of the stator 41 and the motor seat 40 so as to be provided for cooling fluids to flow therethrough and thus dissipating heat produced from the operating torque motor 4.

The gear reducer of the present disclosure is comprised of: a driving gear 51, at least one idle gear 52, and a ring gear 53. As the embodiments shown in FIG. 4 to FIG. 6, the gear reducer 5 is composed of: a driving gear 51, four idle gears 52, and a ring gear 53, in a manner that the driving gear 51 is fixed to the shaft 44 of the torque motor 4; the four idle gears 52 are equiangularly spaced and disposed surrounding the circumference of the driving gear 51 while mashing with the same; the ring gear 53 is disposed coaxially with the driving gear 51 while meshing with the four idle gears 52; and each of the four gears 52 is pivotally coupled to an axial part 54 while enabling each axial part 54 to be fixed to the motor seat 40. In addition, there is an axle seat 55 configured at the ring gear 53 at a side thereof corresponding to the motor seat 40, whereas the axle seat 55 further has a coupling member 56 disposed at a side of same that is corresponding to the torque motor 4, while enabling the coupling member 56 to connect to the first supporting arm 11 by the use of a second bearing 57 and simultaneously couple to the rotary seat 21, by that the coupling member 56 is able to bring along the rotary spindle unit 2 to rotate therewith.

Operationally, the rotor 42 of the torque motor 4 can be coupled directly to the shaft 44 without the use of the panel 43. Thereby, the amount of parts required in the present disclosure can further be reduced.

With the aforesaid configuration, by the transmission of the idle gears 52, the ring gear 53 will be brought along perform a movement of revolution for speed reduction by the driving of the driving gear 51 that is coaxial with the rotation of the driving gear 51, by that the rotary seat 21 of the rotary spindle unit 2 will be driven to rotate by the axle seat 55 through the coupling member 56.

It is noted that the reduction ratio of the gear reducer 5 is determined according to the relationship between the size of the driving gear 51 and the size of the ring gear 53. For clarity, assuming the pitch circle diameters of the driving gear 51 and the ring gear 53 are respectively D1 and D2, the resulting gear ratio will be represented as: output/input=D1/(D1+D2), i.e. if the pitch circle diameter of the ring gear 53 is 5 times the pitch circle diameter of the driving gear 51, the resulting gear reducer 5 will be able to magnify the torque of the torque motor 4 by five times, by that the machining performance of the rotary spindle unit 2 can be greatly enhanced.

Experimentally, by adopting the torque motor, model number: TMK0360-070-3UFS, manufactured by ETEL Motion Technology, which allows a maximum torque of 1044 NM at a rotation speed of 393 rpm, as the torque motor 4 of the present disclosure, the use of the gear reducer 5 is able to enable the rotary seat 21 of the rotary spindle unit 2 to output a maximum torque of 5220 NM at a rotation speed of 7806 rpm. Accordingly, the rotary spindle head of the present disclosure can be utilized for high-speed light-machining and high-torque heavy-machining in aerospace industry or energy-related industry.

From the above description, it is noted that the torque motor 4 and the gear reducer 5 are coaxially disposed that allows the spindle head to have a compact and symmetric configuration, by that not only the torque density is increased and the dynamic load is dispersed, but also a good dynamic balance can be obtained during the operation of the rotary spindle unit.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:
1. A rotary spindle head with gear reducer, comprising:
   a rotary spindle unit, composed of a spindle having a cutting tool mounted thereon and a rotary seat;
   a fork-shaped spindle base, disposed to the machine tool and is rotatably connecting to the rotary spindle unit; and
   a driving unit, having a torque motor and a gear reducer coaxially coupled to the torque motor;

wherein the structure of the coaxially disposed torque motor and the gear reducer is coupled to the fork-shaped spindle base while enabling the gear reducer to further couple to the rotary spindle unit for bringing along the rotary spindle unit to rotate inside the fork-shaped spindle base; and wherein the gear reducer is primarily composed of: a driving gear, at least one idle gear, a ring gear and an axle seat, in a manner that the driving gear is configured to be driven by the torque motor; the at least one idle gear is mesh respectively with the driving gear and the ring gear while being pivotally coupled to an axial part; the ring gear is disposed coaxially with the driving gear and is coupled to the rotary spindle unit by the use of an axis that is formed at a side of the ring gear for bringing along the rotary spindle unit to rotate accordingly.

2. The rotary spindle head of claim 1, wherein the axle seat further comprises: a coupling member, disposed at a side of carrier corresponding to the torque motor for coupling the carrier with the rotary spindle unit.

3. The rotary spindle head of claim 1, wherein the fork-shaped spindle base further comprises: a fixing seat, extrusively formed at a position corresponding to a motor seat of the torque motor while interlocking thereto so as to fixedly secure the torque motor; and the torque motor is further configured with a ring-like stator and a rotor in a manner that the rotor is received inside the ring-like stator while coupling to the same, and is provided for coupling with a shaft for enabling the gear reducer to be driven by the shaft.

4. The rotary spindle head of claim 3, wherein there are a plurality of cooling channels formed at positions between the circumference of the stator and the motor seat so as to be provided for cooling fluids to flow therethrough and thus dissipating heat produced from the operating torque motor.

5. The rotary spindle head of claim 1, wherein the fork-shaped spindle base further comprises: a first supporting arm and a second supporting arm, being respectively configured at two opposite sides of the fork-shaped spindle base that are provided for the rotary spindle unit to be pivotally coupled therebetween.

6. The rotary spindle head of claim 5, wherein both the first supporting arm and the second supporting arm are hollow structures, respectively having a first accommodation space and a second accommodation space formed therein; and the first accommodation space is provided for receiving the driving unit.

7. The rotary spindle head of claim 1, wherein the fork-shaped spindle base further comprises: a locking interface including a plurality of locking holes for the machining tool to be connected thereby.

8. The rotary spindle head of claim 1, wherein the rotary spindle unit further comprises: a rotary seat, pivotally coupled to the fork-shaped spindle base, provided for the spindle to be coupled thereat in a manner that the spindle is disposed downward protruding out of the rotary seat so as to be provided for the cutting tool to mounted thereon and used for machining a workpiece.

9. The rotary spindle head of claim 1, wherein the fork-shaped spindle base further comprises: a brake device and an angle encoder, both disposed at a side of the fork-shaped spindle base at a position corresponding to the driving unit so as to be used for tightly clamping the rotary spindle unit while providing information relating to the precise positioning of the same.

* * * * *